United States Patent [19]
Johnson

[11] Patent Number: 5,429,420
[45] Date of Patent: Jul. 4, 1995

[54] PAVEMENT CUTTING SAW

[75] Inventor: James P. Johnson, Williams, Ariz.

[73] Assignee: Norton Company, Worcester, Mass.

[21] Appl. No.: 176,738

[22] Filed: Jan. 3, 1994

[51] Int. Cl.⁶ .......................... E01C 23/09; B28D 1/04
[52] U.S. Cl. ..................................... 299/39; 125/13.01
[58] Field of Search ...................... 299/39; 404/89, 90, 404/93; 51/176; 125/4, 13.01, 13.03, 14

[56] References Cited
U.S. PATENT DOCUMENTS

| | | | |
|---|---|---|---|
| 2,673,725 | 3/1954 | Coates | 299/39 |
| 3,301,601 | 1/1967 | Zuzelo | 51/176 X |
| 3,387,891 | 6/1968 | Simms et al. | 51/176 X |
| 4,236,356 | 12/1980 | Ward | 125/4 X |
| 4,769,201 | 9/1988 | Chiuminatta et al. | 404/89 X |
| 5,086,750 | 2/1992 | Chiuminatta et al. | 125/13.01 |

FOREIGN PATENT DOCUMENTS

| | | | |
|---|---|---|---|
| 298065 | 4/1954 | Switzerland | 239/39 |
| 2155524 | 9/1985 | United Kingdom | 299/39 |

Primary Examiner—David J. Bagnell
Attorney, Agent, or Firm—Brian M. Kolkowski; Stephen L. Borst

[57] ABSTRACT

A device for cutting cured and uncured (green) pavement including concrete which is capable of cutting a straight groove without the guidance of an operator. The cutting blade is positioned between the front and rear soft contour wheels in a vertical plane which is side-to-side equi-distant between the wheels. The blade, blade drive motor and the wheel drive motor are arranged so that each wheel carries approximately the same weight to enable the cutting device to move, unassisted, in a straight line.

26 Claims, 14 Drawing Sheets

PAVEMENT CUTTING SAW

BACKGROUND OF THE INVENTION

Machines for cutting grooves in a cured pavement such as concrete, asphalt or the like are well known. Such machines conventionally weigh 400 pounds or more. See for example, U.S. Pat. No. 4,456,303. Because of the heavy weight and large size, such machines must be used by a skilled operator who can control and guide them to perform the desired cutting operation. Such machines are constructed so that the cutting blade is off center. This facilitates the use of the blade for cutting close to buildings or other solid structures such as curbs or the like. While this is a useful feature, the placement of the blade off-center creates a weight imbalance which makes it difficult for even a skilled operator to cut a straight groove in pavement. These saws are only useful in cutting grooves in pavements which have fully cured and are not useful in grooving expansion joints in uncured or "green" concrete because of their weight. The use of the large and heavy pavement saws on green concrete will leave impressions in the concrete and thereby permanently ruin the surface.

Thus there was a need for a saw which cuts a groove in green concrete. One such saw that is currently on the market is the Soffcut saw manufactured by Soffcut International. This saw is little more than a circular saw mounted on a skateboard-type plate. It is light in weight, on the order of about 25 lbs. However, due to its light weight its performance suffers. It pulls apart the green concrete aggregate rather than cutting it, leaving voids and an uneven cut. The voids result in a weakened pavement after curing which is subject to cracking. Another such saw is the Green Machine ® manufactured by Cardinal Industries. U.S. Pat. No. 5,086,750 discloses still another green concrete cutting saw. These green concrete cutting machines have not been entirely satisfactory for various reasons. The blades cut in an upward direction which often pulls aggregate out of green concrete or loosens it sufficiently to weaken the concrete. Also, the machines have off-center blades, use hard skateboard-type wheels which can leave marks in some green concrete, and are difficult to steer and maintain a straight line cut. Moreover, such saws, because of their light weight, are incapable of cutting cured concrete or other cured pavement. When used for cutting green concrete they are preferably best used at an early stage of curing since concrete that is almost fully cured may force the saw blade to lump up out of the cutting groove leaving a groove of uneven depth. In addition, such saws can only cut to a maximum depth of about 1.25" (3.2 cm), thereby restricting their use to concrete slabs less than about 5" (12.7 cm) thick.

Accordingly, there is a need for a saw which can cut uncured pavement, particularly green concrete, and cured pavement equally well and without the need for significant operator control. Preferably, such a saw should be capable of cutting a straight groove with little or no operator assistance. When used with green concrete, the saw must not leave any visually noticeable markings on the green concrete and be capable of cutting deep grooves at a depth of up to about 3.5" (8.9 cm) so that it can be used on green concrete slabs up to 14" (35.6 cm) thick.

DISCLOSURE OF THE INVENTION

The present invention is directed to a device for cutting a groove in concrete pavement comprising a main body member having left and right sides and front and rear ends. Preferably, the main body member is an integral member or "unibody", with various attachment points for the components which complete the cutting device. The device further includes a blade member adjustably attached to the main body member and a means for driving the blade member attached to the main body member and positioned at least partially above the blade. The blade is positioned in a vertical plane substantially equi-distant between the left and right sides of the main body member and in a position relative to the front and rear ends of the main body member so that the weight of the device is substantially distributed equally about the blade. While the cutting device of the present invention is considerably lighter in weight (about 50 to 60 lbs) than the conventional 400 lb machines, it is somewhat heavier than machines useful only in cutting green concrete. The increased weight is required to enable the device of the present invention to cut cured concrete together with green concrete and to accomplish a good cut in green concrete. The design of the cutting device of the present invention takes advantage of the increased weight (over green cut machines) while minimizing the disadvantages associated with the increased weight.

The cutting device further comprises a pair of front wheels attached to a single front axle and a pair of rear wheels attached to a single rear axle. The rear and front axles generally have the same length and each of the wheels are the same size so that the wheels on the left side of the main body member are aligned parallel to the wheels on the right aide of the device. The combination of the equi-distribution of the weight of the device about the blade member together with the wheel alignment and single axle construction results in a cutting device which is capable of cutting straight and even with little or no operator assistance whether cutting cured or green concrete. In fact, with the use of a drive mechanism on the rear or front wheels, the cutting device is capable of cutting straight without the need for an operator to guide it. This is a significant advantage over prior art devices which require considerable operator control to cut, much less cut straight.

The wheels of the cutting device of the present invention possess unique features, including their shape and softness, which features are useful in compensating for the increased weight of the present device. The wheels are preferably made of a plastic material such as polyurethane which is relatively soft having a Shore A Durometer hardness in the range of about 15 to 45. The softness of the wheels allows the wheels to flatten out in use providing a relatively large surface area over which to spread the weight of the cutting device. Compared to the hard skateboard-type polyurethane wheels used on, for example, the Soffcut saw, the surface area achieved by the wheels of the present invention is about 32 times greater than the surface area achieved by the prior art machines. This makes it far less likely that the cutting device of the present invention will leave any impression in green concrete during use in spite of its increased weight over machines such as the Soffcut saw. The increased surface area also provides for better traction, especially when the device is self-propelled.

Despite the relatively light weight (compared to the 400 lbs machines) of the cutting device of the present invention and its 'soft' wheels, in certain circumstances, e.g. very green concrete, a slight impression may be left by the wheels of the cutting device. The wheels are, however, designed to make any impression difficult to visually notice. This is accomplished by molding the wheels with concave sides so that the outer perimeter of each side of a wheel contains a very thin layer of polyurethane which gradually increases in thickness traveling axially towards the center of the wheel from either side. The thin outer edges bend or collapse more than the thicker center portion of the wheel under the weight of the cutting device so that any impression left by the cutting device will be feathered towards the center of the wheel making it difficult to observe visually. This is an advantage over wheels with a flat inner and outer sides which leave a sharp edge in the green concrete.

Another feature of the cutting device of the present invention is its unibody design. The main body member preferably comprises an integral shell preferably constructed of cast aluminum. The main body member contains points of attachment for various components of the cutting device such as the motors which drive the wheels and blade and the electronic control box for such motors. This unibody design keeps the weight of the cutting device at a minimum by minimizing the number of components needed to form the machine, many of which are duplicative adding unnecessary weight.

The main body member also contains a blade guard portion extending from near the front of the cutting device to the rear. The blade guard portion increases in width from the front to the rear, generally from about 2" (5.1 cm) in total width to about 5" (12.7 cm). This shape assists in dissipating the air turbulence caused by the blade and results in settling of much of the dust generated during cutting. This blade guard portion is designed to minimize the dust created during cutting. The key feature of this design is the flared shape of the blade guard at the rear, preferably about 1.5 to 2" (3.8–5.1 cm) from each side of the blade.

Preferably, the cutting device of the present invention is self-propelled with the drive means being located in the rear of the main body member and driving the rear wheels. In a preferred embodiment, the rear axle is part of the gear motor that drives the rear wheels. This embodiment eliminates parts and aids in steering control. This results in equal torque to each side of the device, which, when combined with the enhanced traction provided by the soft wheels, produces a machine which maintains a straight cutting line.

The blade on the cutting device is adjustable to permit varying the cutting height from more than 0 up to about 3.5" (8.9 cm). This contrasts with commercially available green concrete saws which can only cut to depth of about 1.5" (3.8 cm). The deeper cut, per American Concrete Institute standards for concrete saws which require a saw to be capable of cutting concrete to at least 25% of the depth of a concrete slab, permits the use of the saw on concrete slabs up to 14" (35.6 cm) thick as opposed to only 6" (15.2 cm). The blade/wheel alignment is also adjustable using an adjustable cam mechanism to compensate for irregular blade cutting characteristics.

Unlike all other saws on the market today, the cutting device of the present invention is the only concrete cutting saw which is capable of cutting both green and cured concrete. Moreover, it is a portable unit which is easily transportable and extremely easy to operate.

DETAILED DESCRIPTION OF THE PREFERRED EMBODIMENTS

Figure 1:
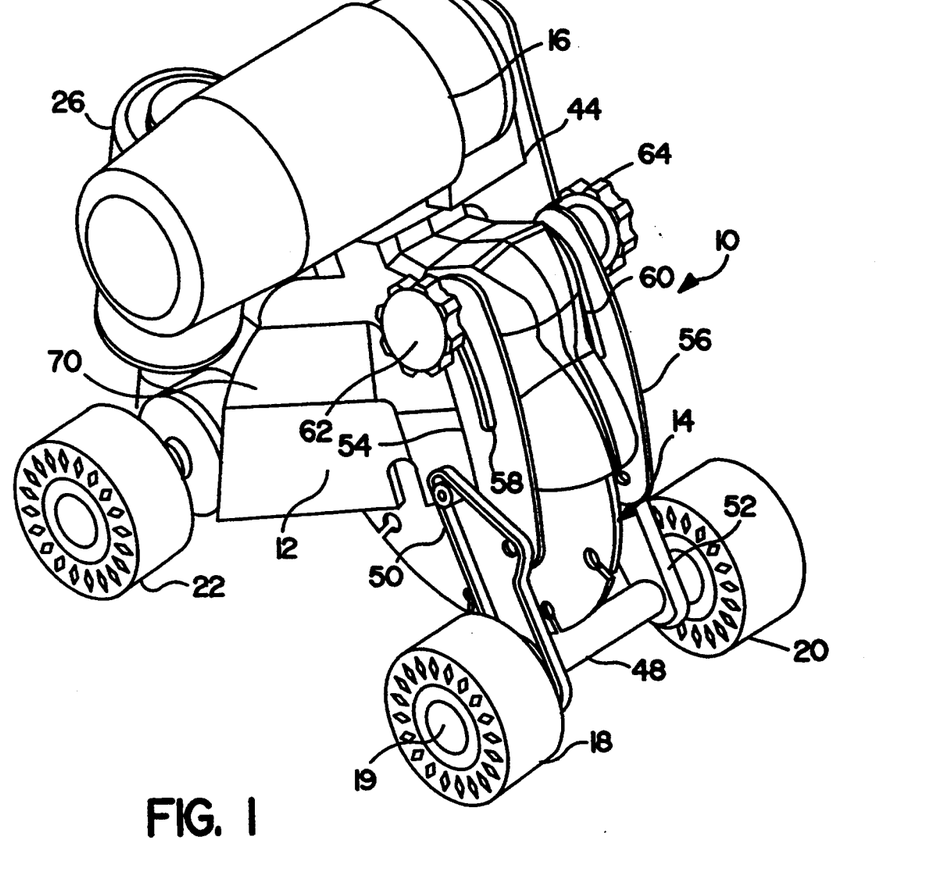
FIG. 1 is an elevated perspective view of the front of the cutting device of the present invention.

The pavement cutting device of the present invention will now be more particularly described with reference to the drawings. Referring to FIG. 1, the cutting device 10 of the present invention generally comprises a main body member 12, a blade 14, a blade drive means or motor 16, a pair of front wheels 18, 20, a pair of rear wheels 22 and 24, a wheel gear drive motor 26 for driving the rear wheel 22 and 24, and a blade guard section 28 formed as part of the main body member 12.

Figure 5A:
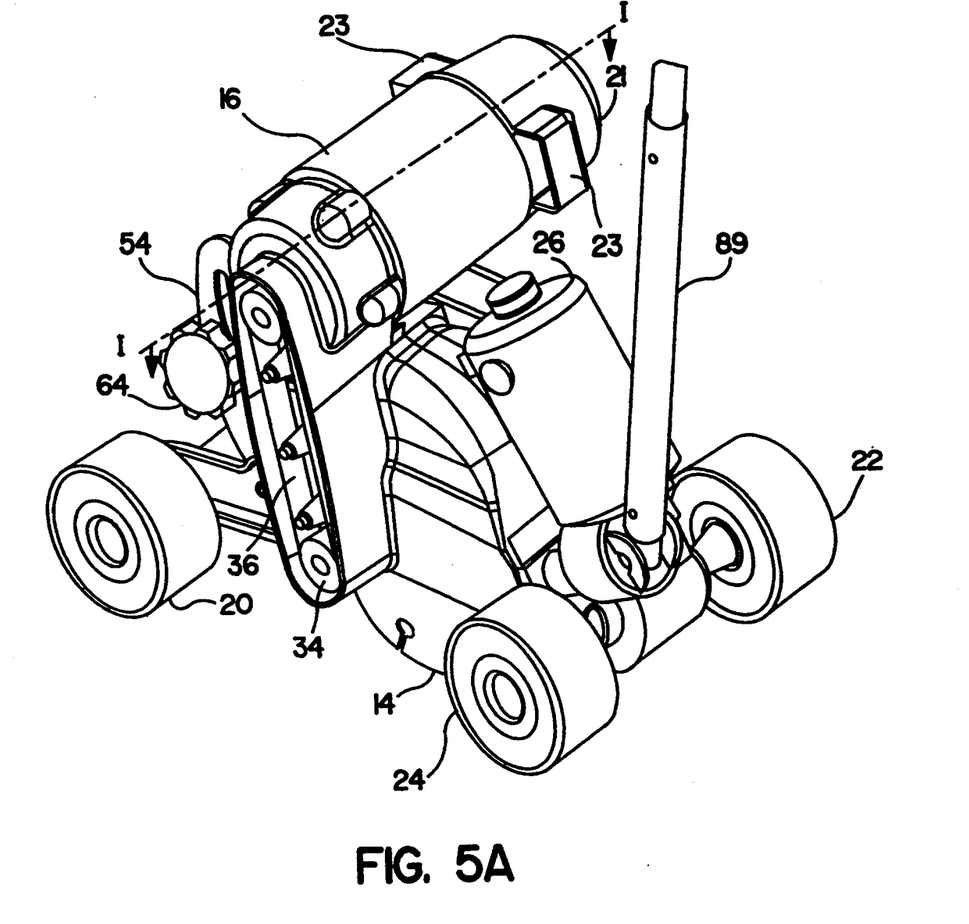
FIG. 5A is an elevated perspective view of the rear end of the cutting device of the present invention.
Figure 5B:
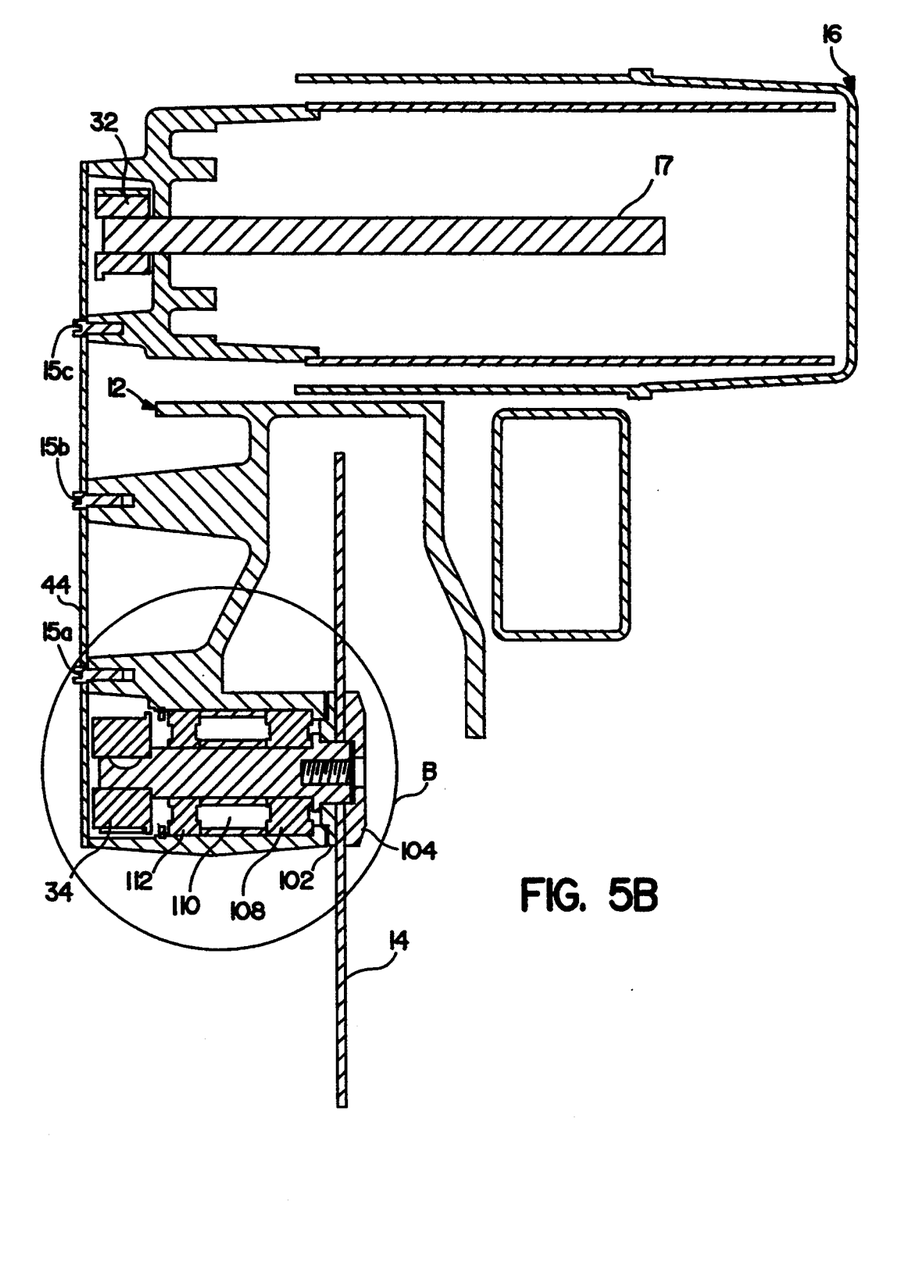
FIG. 5B is a sectional view of the cutting device of the present invention taken along line I—I of FIG. 5A.
Figure 5C:
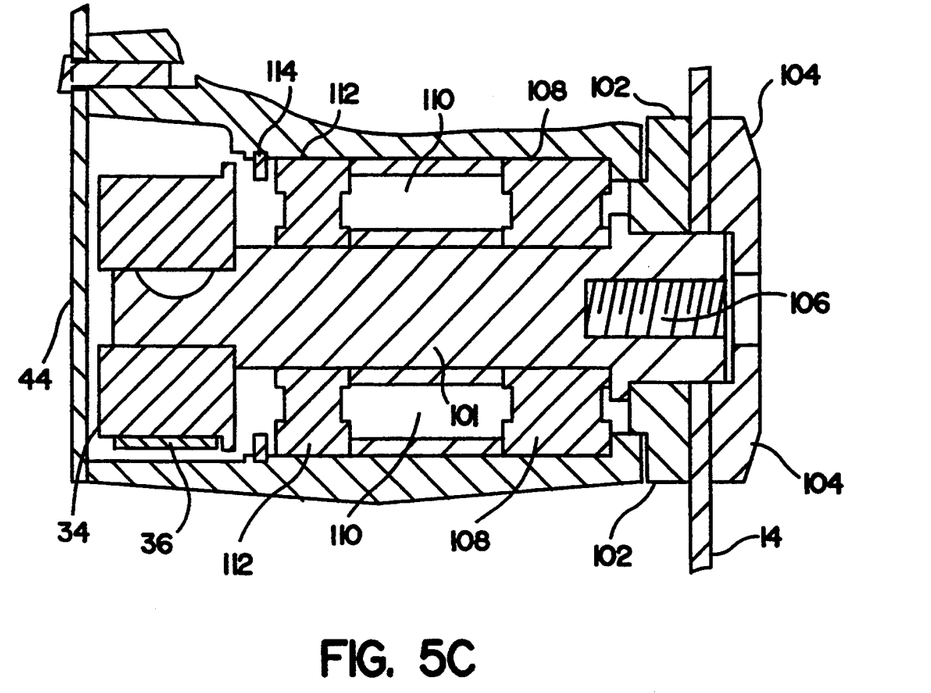
FIG. 5C is an exploded view of the area shown in the circled region in FIG. 5B.
Figure 11:
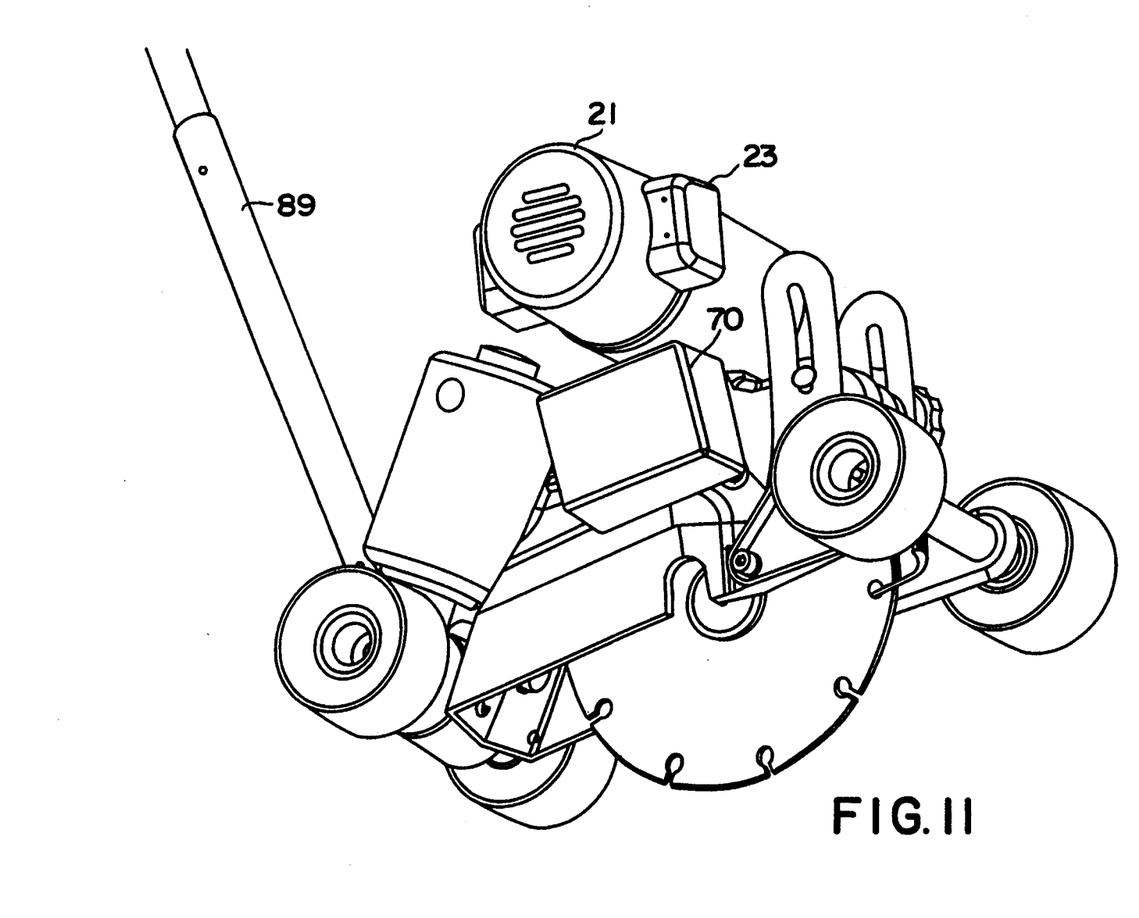
FIG. 11 is a lower prospective view of the cutting device of the present invention taken from the right side thereof.

The blade 14 is driven by motor 16 which is connected to the motor by means of a pulley system. The motor 16 is relatively light weight while generating substantial power. It should generally weigh about 15–25 pounds while putting out about 2.5 horsepower or more. The motor rpm's under load should be in the range of about 6,000 to 7,000 rpm. Such a motor preferably is a totally enclosed universal wound combination series/shunt motor with oversize bearings and brushes to facilitate a large amperage load carrying capacity. FIGS. 5A and 11 show a motor 16 with a fan protector 21 and brush protectors 23. As best shown in FIGS. 5A, 5B and 5C, the motor 16 contains a shaft 17 which rotates during operation and is attached to a pulley 32 which is connected to another pulley 34 by means of a cog belt 36. Pulley 34 is attached to a shaft 101 which extends inward and attaches to the blade 14 by means of inner and outer flanges 102 and 104. The inner and outer flanges 102 and 104 sandwich the blade therebetween and are held in place by a bolt (not shown) which is screwed into a threaded recess 106 in shaft 101. The shaft 101 is surrounded by an outer bearing 108, a bearing spacer 110 and an inner bearing 112. Nap ring 114 holds this bearing and spacer assembly in place. In operation, as the pulley 34 rotates, it rotates the shaft 101 within the bearings and the shaft rotates blade 14 in a counterclockwise direction, i.e. so that the cut is downward through the concrete, rather than upward. A belt guard cover 44 covers this pulley and cog belt mechanism to seal it from the environment. It is attached thereto by bolts 15 a, b, and c.

Figure 3:
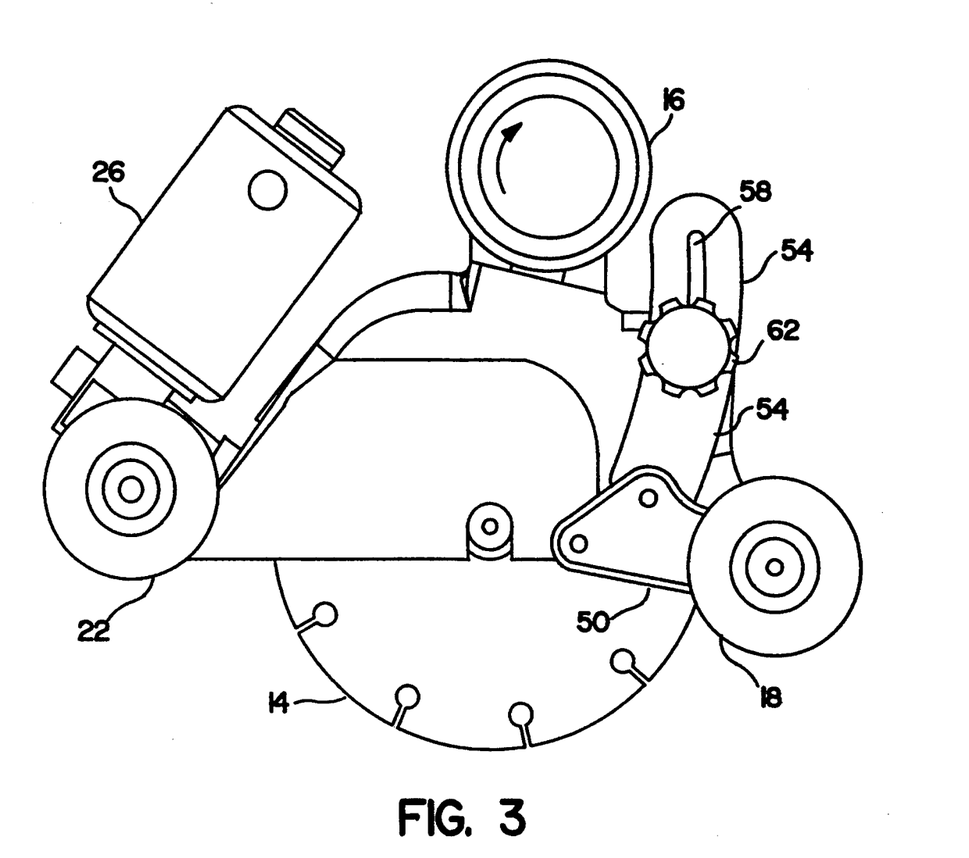
FIG. 3 is a side view of the cutting device of the present invention showing the blade at its maximum cutting depth.
Figure 4:
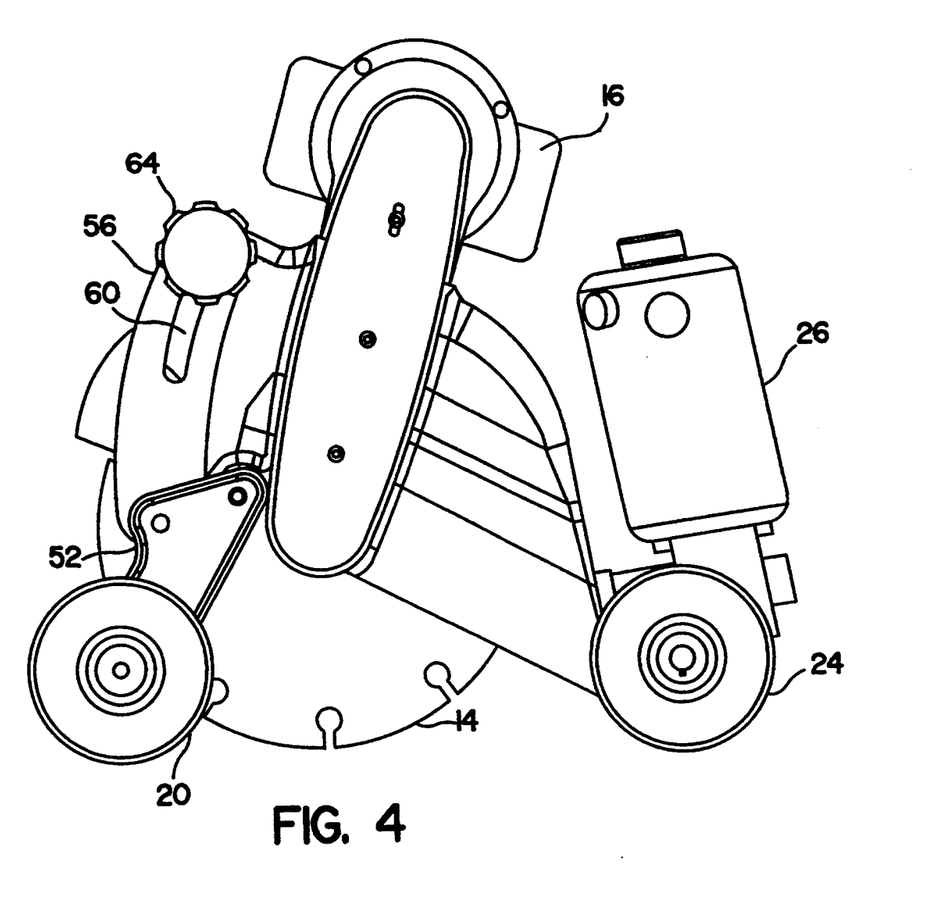
FIG. 4 is a side view of the cutting device of the present invention opposite to that of FIG. 3 showing the blade prepared for transport with the blade clear of the concrete.
Figure 6:
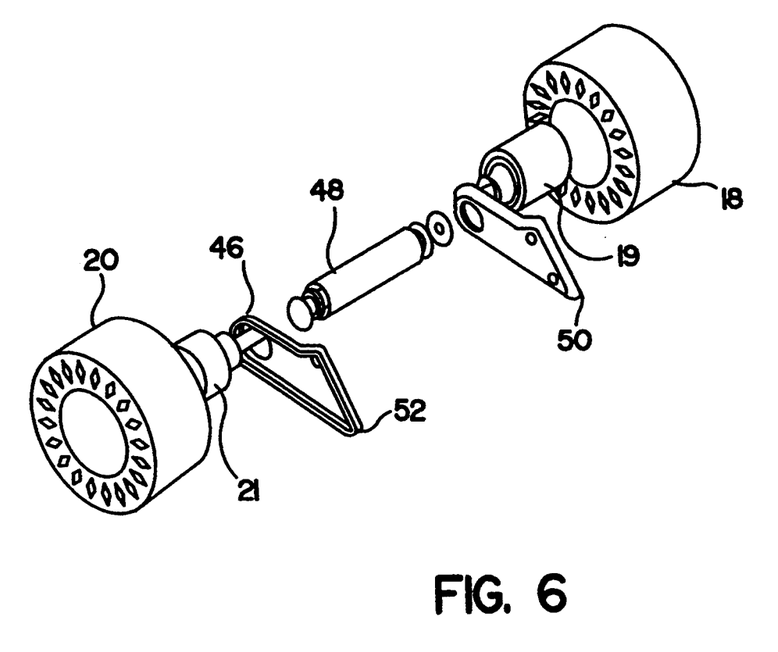
FIG. 6 is an elevated perspective view of the front wheel assembly being attached to the swing arms.

As best shown in FIGS. 1 and 6, the front wheels 18 and 20 are connected together by means of a single front axle 46 which extends through an axle housing 48 and attaches to the wheels 18 and 20 through hub assemblies 19 and 21. The axle 46 also extends through swing arms 50 and 52. Swing arms 50 and 52 are pivotally attached to the corresponding banana struts 54 and 56 and are attached to the main body 12 on either side by means of threaded bolt 51. The banana struts 54 and 56 are adjustable relative to the main body member 12 to which they are attached. As best shown in FIGS. 1, 3, and 11, the banana struts 54 and 56 each contain slots 58 and 60. A rod (not shown) threaded at each end passes through the opening 66 in the main body member 12 and through each of the slots 58 and 60 in the banana struts 54 and 56. The banana struts are attached by tightening knobs 62 and 64, thereby securing the banana struts to the main body member 12. In operation, by loosening knobs 62 and 64, the struts 54 and 56 can be moved upwardly along slots 58 and 60 until the rod extending between knobs 62 and 64 reaches the lower end of the slots 58 and 60 as shown in FIG. 3. As the struts 54 and 56 move upward the front wheels are raised until they reach their maximum height as shown in FIG. 3. At this height, the cutting depth of the blade is at its maximum depth of about 3.5". When in the position shown in FIG. 1, the blade has a clearance of about 0.25" (0.6 cm) above the slab. The blade can be set to any cutting depth within the range of about 0–3.5" by positioning the struts 54 and 58 at the appropriate position along the slots 58 and 60 relative to the main body member 12.

Any conventional blade 14 useful in cutting pavement may be used. The blade is typically circular and generally made of carborundum or diamond coated steel. The blade has two generally flat sides, a leading or cutting edge and a trailing edge. The blade is generally about 9–10" (22.9–25.4 cm) in diameter and has a width of from about 0.050 to 0.125" (0.1 to 0.3 cm). Suitable such blades are well known in the industry and are generally segmented sintered diamond saw blades.

Figure 2:
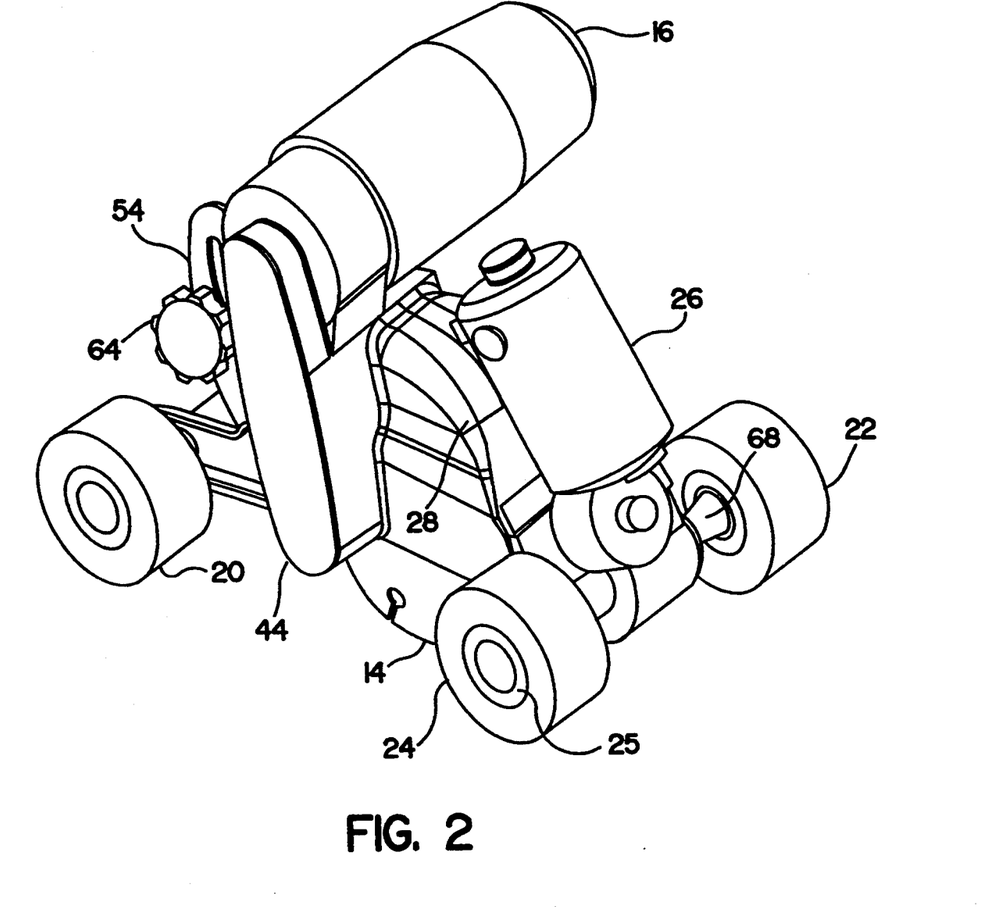
FIG. 2 is an elevated perspective view of the rear end of the cutting device of the present invention.

As best shown in FIG. 2, the rear wheels 22 and 24 are connected to a single rear axle 68, which is part of the wheel gear motor drive 26. The use of the wheel gear drive motor in this manner eliminates the need for additional parts to form and secure a rear axle. Like the front wheel assembly, the rear axle attaches to the rear wheels by means of hub assemblies 23 and 25.

Both the wheel gear drive motor 26 and the blade drive motor 16 are connected to an electronic control box 70 of conventional design which is attached to the main body member 12. The control box 70 is only shown in FIG. 11. The electronic control box 70 contains a conventional proportional controller which enables the gear motor speed to be controlled. The gear motor speed can be adjusted so that the cutting device can be propelled at a rate up to about 10 feet/minute. The blade motor preferably runs at a constant speed. The electronic control box can be connected to a source of electricity by means of a wire (not shown) to supply power to both the blade motor and the gear motor of the cutting device.

Figure 7:
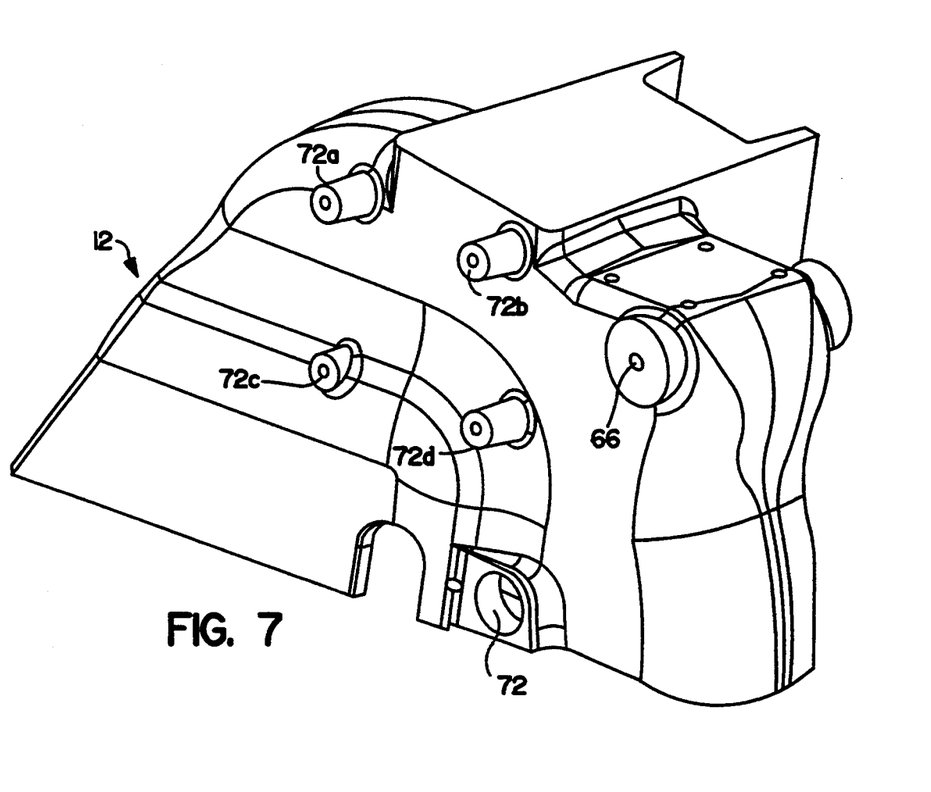
FIG. 7 is an elevated perspective view of the front of the main body member.
Figure 8:
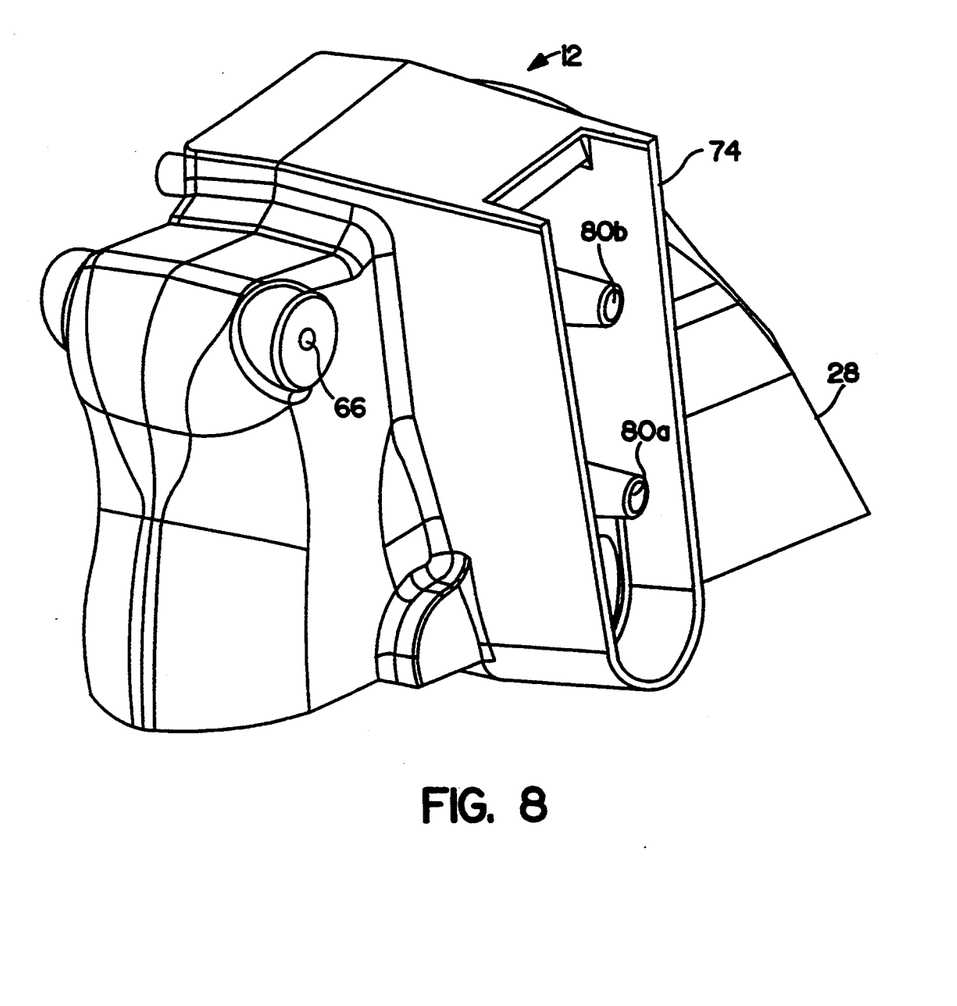
FIG. 8 is an elevated perspective view of the front of the main body member front the opposite side as shown in FIG. 7.

The main body member 12 is preferably constructed as an integral unit or a "unibody". To minimize the weight of the cutting device the unibody is preferably made from cast aluminum although other suitable materials such as injection molded plastic, die cast, or cast iron may be used. The unibody is best seen in FIGS. 7 and 8. As shown, the unibody contains internally threaded studs 72 a, b, c and d to which the electronic control box 70 is attached. The unibody 12 also contains hole 66 for placement of rod which extends between knobs 62 and 64. Hole 72 is also pre-formed in the unibody 12 for insertion of a cam mechanism used to adjust the alignment of the blade 14. This mechanism is discussed hereinafter in greater detail. As shown in FIG. 8, the unibody 12 is formed with a belt guard portion 74 for protection of the pulley and cog belt mechanism 32, 34 and 36. A guard belt cover 44 may be bolted to threaded shafts 80a and b to seal the belt and pulley mechanism from the environment.

The unibody 12 also contains a blade guard portion 28 shown best in FIGS. 2 and 8. This portion of the unibody is spaced from the blade by more than about 1.5", preferably by about 2" on each side. The surface facing the blade has a flared (convex) contour. This design minimizes dust resulting from cutting by minimizing air turbulence.

The blade 14 is positioned within the unibody 12 so that the weight of the entire device is equally distributed about the blade. This design facilitates a straight cut and minimizes the need for operator control of the cutting device during use. The wheel design also aids in ability of the cutting device 10 to make straight cuts with little or no operator control. Thus, preferably each of the rear and front axles 68 and 46, respectively, are of the same length and are single axles. Preferably each axle is about 10" (25.4 cm) in length. Each of the four wheels 18, 20, 22 and 24 are also of the same size and shape. Each wheel has a diameter of about 4" (10.2 cm) and a width of about 2.5" (6.4 cm). The wheels are preferably aligned such that an imaginary line joining the two left side wheels 20 and 24 and an imaginary line joining the two right sides wheels 18 and 22 are parallel.

The wheels themselves are preferably constructed from a very soft plastic material such as polyurethane having a Shore A Durometer hardness of from about 15 to 45, preferably about 20 to 30, and most preferably about 25. In use, such wheels flatten so that the surface area of a wheel having a width of about 2.5" (6.4 cm) in contact with the pavement is about 1 sq. in. (6.5 cm$^2$). This results in an increase in surface area sixteen fold compared to conventional skateboard hard urethane wheels used in the Soffcut saw. As a result, the weight of the device is spread out over a greater surface area minimizing the likelihood of any impression being left when the saw is used for green concrete. The increased surface area also improves traction of the rear self-propelled wheels.

Figure 9A:
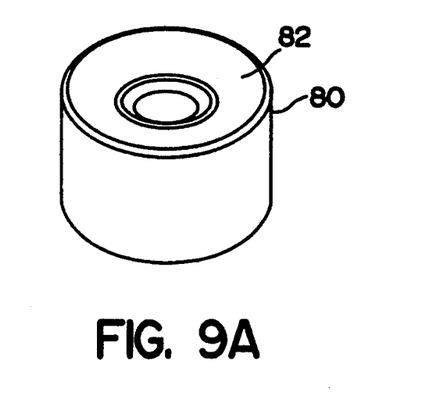
FIG. 9A is an elevated perspective view of a wheel used on the cutting device.
Figure 9B:
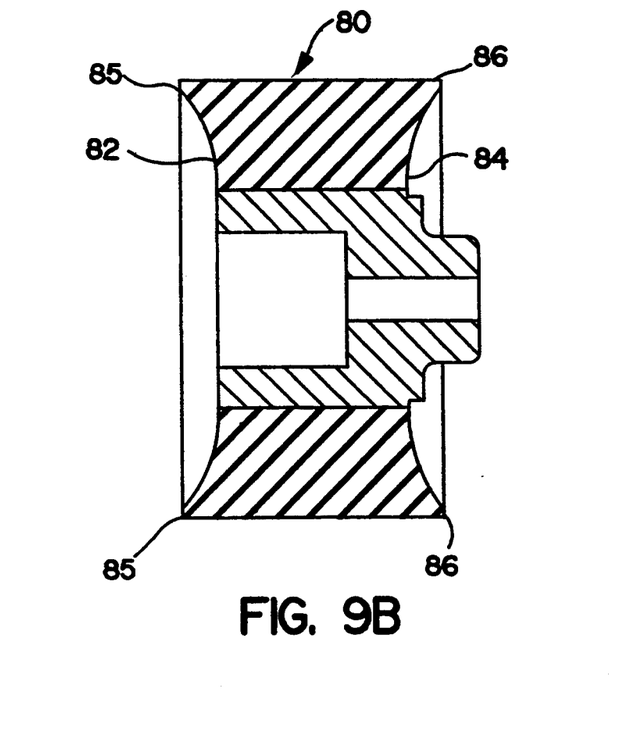
FIG. 9B is a side view of the wheel of FIG. 9A.

In certain situations involving very green concrete, despite the surface area advantage of the wheels of the present invention, slight impression may still be left after use. To make such an impression difficult to notice, the wheels of the cutting device have been contoured. As best shown in FIGS. 9A and 9B, each wheel 80 is molded so that sides 82 and 84 have a concave shape. This results in the wheel 80 having thin edges 85 and 86 at its outer perimeter. As you travel inward toward the center of the wheel from either edge 85 or 86, the edge becomes thicker. In use, the thin outer edges bend and collapse under the weight of the cutting device thereby feathering any impression made. This is in contrast to a sharp edge which would be made by wheels having flat sides.

The cutting device 10 may also contain a removable telescoping handle 89 only in FIGS. 5A and 11 which is attached to the gear motor 26 and extends upward. While a handle can be used to steer the machine, it is not necessary for cutting a straight line. As such the handle is predominantly used for transporting the cutting device when the device is non-operational.

Figure 10A:
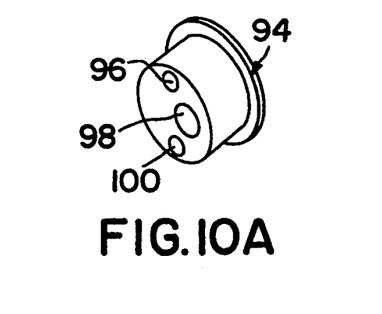
FIG. 10A is a elevated perspective view of the cam alignment mechanism.
Figure 10B:
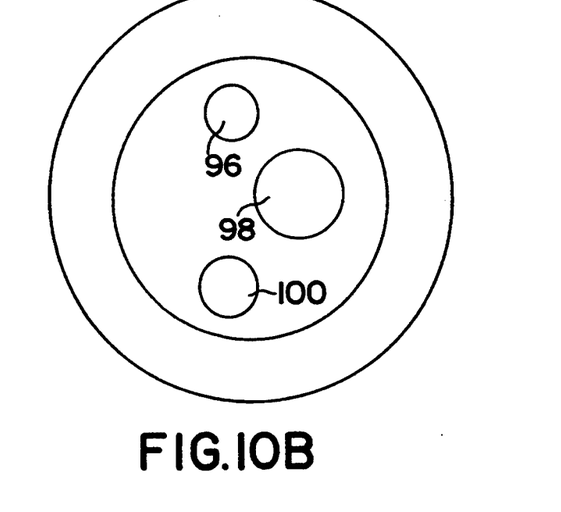
FIG. 10B is a side view of the cam mechanism of 10A.
Figure 12:
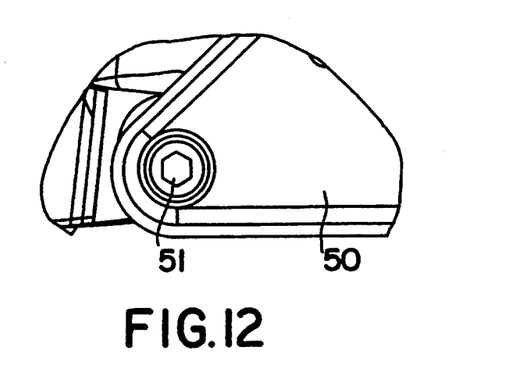
FIG. 12 is an exploded view of a portion of the cutting device of the present invention showing the attachment of the swing arm to the unibody.
Figure 13:
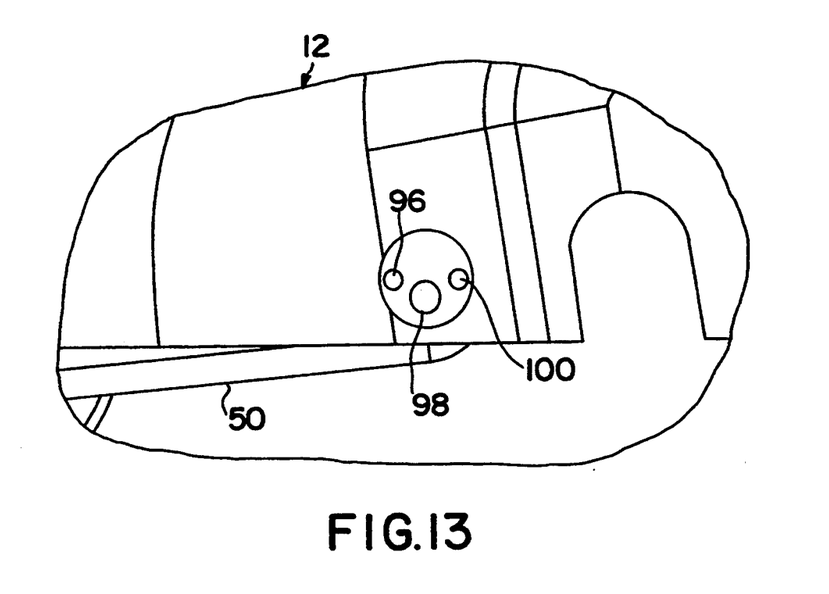
FIG. 13 is an exploded view of the region of the cutting device of the present invention showing the cam attachment to the unibody inside the guard portion looking in the opposite direction than the direction viewed in FIG. 12.

Should the blade get slightly out of alignment during use, the blade can be realigned using an adjustment cam 94 shown in FIG. 10. This cam contains holes 96, 98 and 100. As best shown in FIGS. 12 and 13, the cam 94 is attached on the inside surface of the main body 12 with a bolt 51, which bolt is also used to attach the swing arm 50. The bolt 51 is passed through the center hole 98 of the cam 94. FIG. 13, which is a view from inside of the main body 12 looking outward, shows that the cam is held in place relative to the main body 12 by means of two screws threaded through holes 96 and 100, which screws impinge on the inside of the main body 12 and prevent the cam from rotating. Should the alignment of the cutting device be altered during operation, the alignment can be readjusted by means of the cam 94 by loosening the screws in holes 96 and 100 and allowing the cam to be rotated. Because of the off-centered configuration of the holes 96, 98, and 100, rotation of the cam will cause one side of the front axle to either be forced frontward or rearward by up to about ⅜" (1 cm), depending upon which way the cam is rotated. Once the cam is in the desired position, the two screws 96 and 100 are tightened and the cutting device is ready for operation again.

What is claimed is:

1. A device for cutting a groove in pavement comprising a main body member having left and right sides, and front and rear ends; a pair of opposed front wheels attached to the front end of the main body member; a pair of opposed rear wheels attached to the rear end of the main body member; a blade for use in cutting pavement, said blade being removably adjustably attached to the main body member; a means for driving the blade attached to the main body member and positioned at least partially over the blade; said device having a defined weight; said blade being positioned in a vertical plane substantially equi-distant between the left and right sides of the main body member and in a position relative to the front and rear ends of the main body member so that the weight of the device is distributed substantially equally among the wheels during operation of the cutting device.

2. The device of claim 1, wherein the pair of opposed front wheels are attached at opposite ends of a single front axle which axle is attached to the main body member at about its front end and the pair of opposed rear wheels are attached at opposite ends of a single rear axle, which axle is attached to the main body member at about the rear end thereof.

3. The device of claim 2, wherein the wheels have a Shore A Durometer hardness of from about 15 to 45.

4. The device of claim 3, wherein the wheels are made from a polyurethane polymer.

5. The device of claim 2, wherein each of the wheels has two sides and each side has a concave shape.

6. The device of claim 5, wherein the front and rear axles have the same length, each of the wheels is substantially the same size, and the wheels on the left side of the main body member are aligned in parallel to the wheels on the right side of the main body member.

7. The device of claim 2, further comprising means for driving at least one pair of wheels.

8. The device of claim 7, wherein the wheel drive means is attached to the rear axle.

9. The device of claim 8, wherein the wheel drive means is attached to the main body member at about the rear end of the main body member.

10. The device of claim 9, wherein the wheel drive means is a gear motor having as a part thereof the rear axle.

11. The device of claim 7, further comprising an electronic control means for controlling the blade drive means and the wheel drive means.

12. The device of claim 7, wherein the wheel drive means is an electric motor.

13. The device of claim 12, wherein the wheel drive means operates at variable speeds.

14. The device of claim 2, further comprising a means for adjusting the position of the front axle rearward or frontward to align the blade.

15. The device of claim 14, wherein the front axle adjustment means is a cam member.

16. The device of claim 1, further comprising a means for adjusting the position of the blade member upward or downward in the vertical plane for controlling the cutting depth of the cut of the blade.

17. The device of claim 16, wherein the blade adjustment means comprises a pair of opposed strut members pivotally attached to a pair of opposed swing arm members, said swing arms being attached to said front axle, each of said strut members having a slot extending along its length, said strut members being movable relative to the main body member along its slot so as to facilitate a height adjustment of the blade member relative to a cutting surface.

18. The device of claim 1, wherein the main body member has a blade guard portion at its rear end, said blade guard portion being spaced from the blade member and having surface facing the blade member at least a portion of which is convex in shape.

19. The device of claim 18, wherein the surface of the blade guard member is spaced from the blade a distance greater than about 1.5 inches (3.8 cm).

20. The device of claim 18, wherein the distance is greater than about 3 inches (7.6 cm).

21. The device of claim 1, wherein the main body member is an integral structure.

22. The device of claim 21, wherein the main body member is constructed from cast aluminum.

23. The device of claim 1, wherein the blade drive means is connected to the blade by a pulley and cog belt mechanism.

24. The device of claim 23, wherein the blade drive means is an electric motor.

25. The device of claim 24, wherein the blade drive means operates at a single speed.

26. The device of claim 1, wherein the blade is circular in shape.

* * * * *